J. M. MICHAELSON.
FRICTION CLUTCH MECHANISM.
APPLICATION FILED OCT. 20, 1913.

1,122,020.

Patented Dec. 22, 1914.
2 SHEETS—SHEET 1.

Witnesses,
A. H. Opsahl.
E. C. Skinkle

Inventor:
Joseph M. Michaelson,
By his Attorneys
Williamson &...

J. M. MICHAELSON.
FRICTION CLUTCH MECHANISM.
APPLICATION FILED OCT. 20, 1913.

1,122,020.

Patented Dec. 22, 1914.

2 SHEETS—SHEET 2.

Witnesses
A. H. Opsahl
E. C. Skinkle

Inventor
Joseph M. Michaelson
By his Attorneys
Williamson & Merchant

UNITED STATES PATENT OFFICE.

JOSEPH M. MICHAELSON, OF MINNEAPOLIS, MINNESOTA.

FRICTION-CLUTCH MECHANISM.

1,122,020.   Specification of Letters Patent.   Patented Dec. 22, 1914.

Application filed October 20, 1913. Serial No. 796,173.

*To all whom it may concern:*

Be it known that I, JOSEPH M. MICHAELSON, a citizen of the United States, residing at Minneapolis, in the county of Hennepin and State of Minnesota, have invented certain new and useful Improvements in Friction-Clutch Mechanism; and I do hereby declare the following to be a full, clear, and exact description of the invention, such as will enable others skilled in the art to which it appertains to make and use the same.

My invention has for its object to provide an improved friction clutch mechanism especially adapted for use in the transmission mechanism of a motorcycle, but adapted for use for more general use. The invention is directed particularly, to an improved clutch actuating mechanism for use in connection with so-called multiple-disk clutches, and the invention provides an extremely simple and highly efficient clutch actuating mechanism in which the clutch actuating mechanism proper is brought into a very compact arrangement and close association with both the clutch and the various gears of the transmission mechanism, all being inclosed within a common casing.

In the accompanying drawings which illustrate the invention, like characters indicate like parts throughout the several views.

Figure 1:
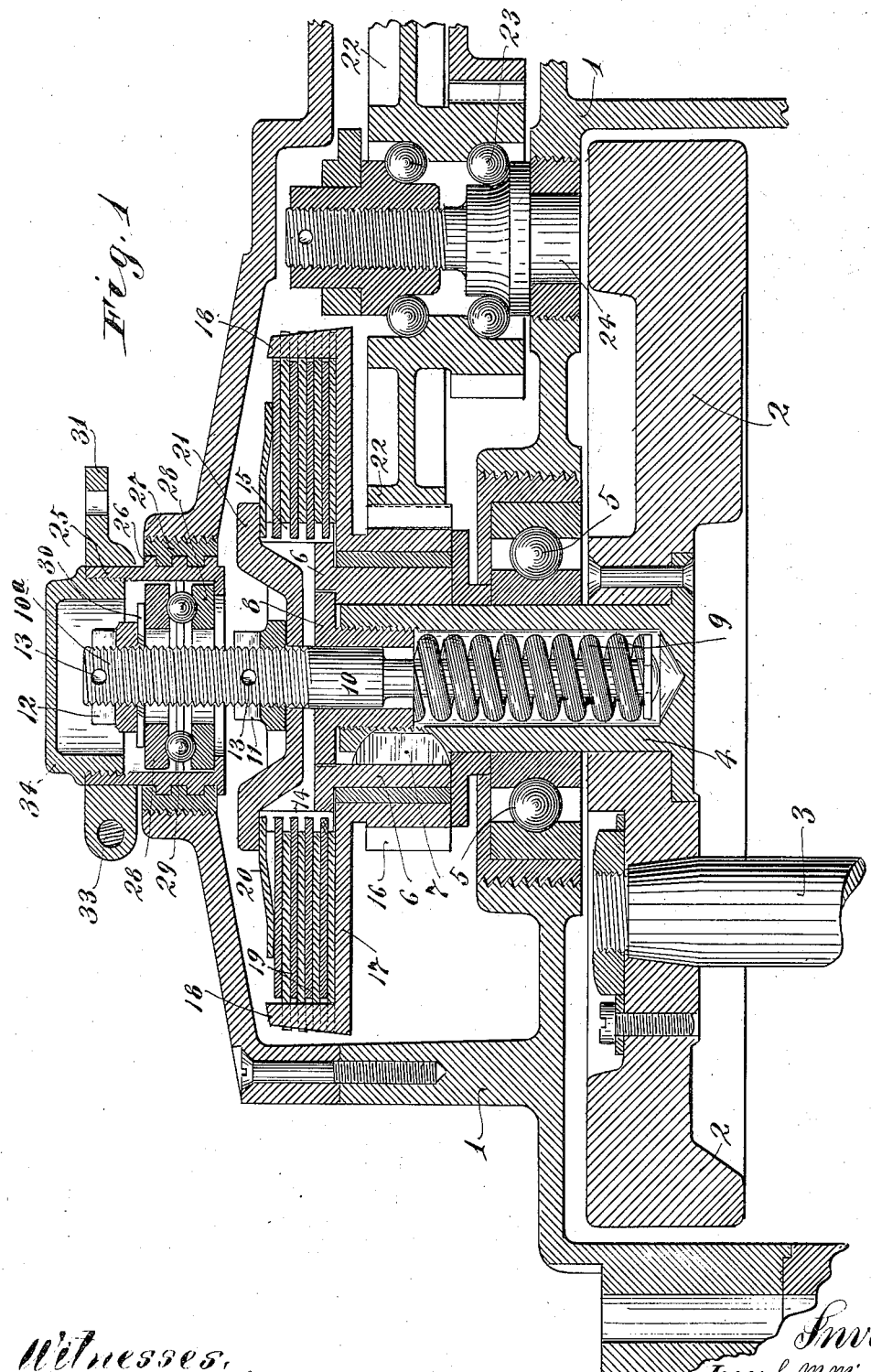
Figure 2:
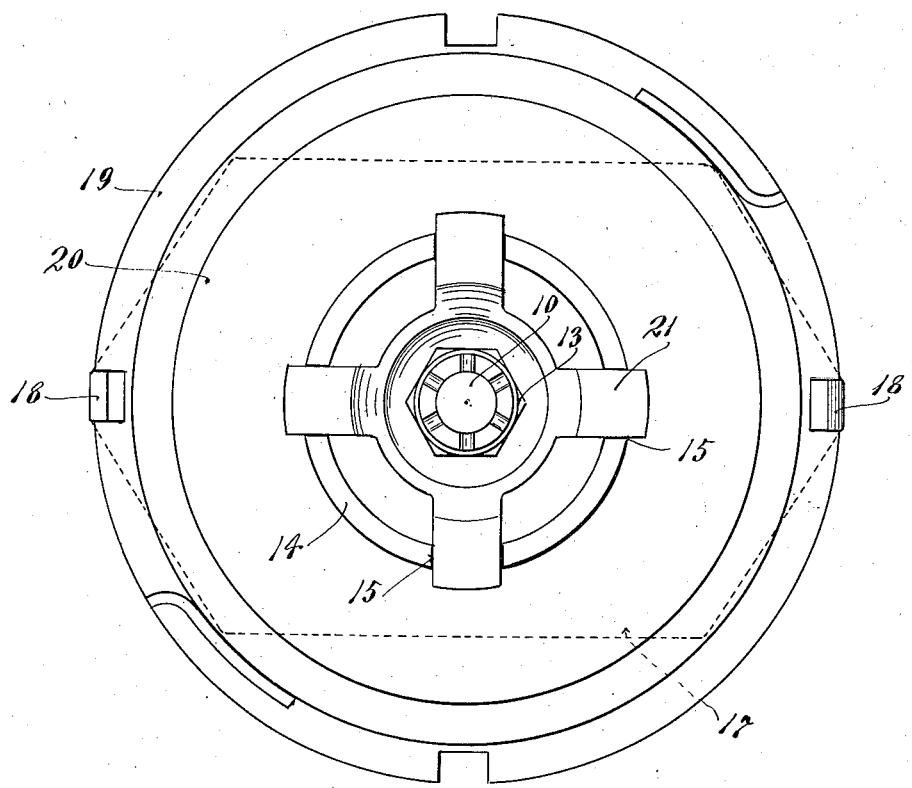
Figure 3:
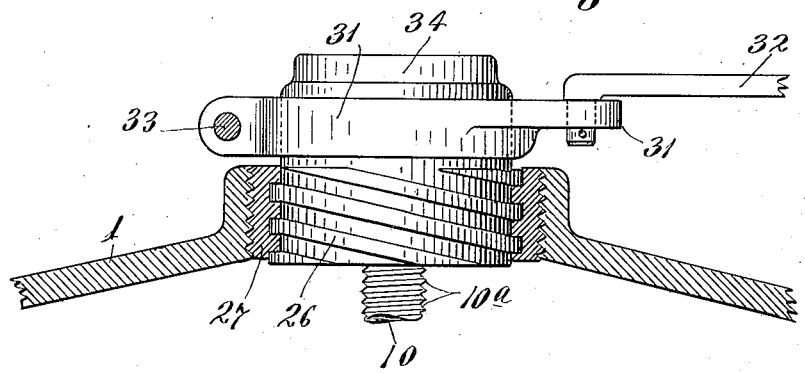

Referring to the drawings: Figure 1 is a horizontal section taken centrally through the multiple-disk clutch, clutch actuating mechanism and various gears, and the gear casing of the transmission mechanism of a motorcycle; Fig. 2 is a detail view in side elevation showing the multiple disk clutch mechanism; and Fig. 3 is a fragmentary view partly in plan and partly in horizontal section showing the clutch actuating sleeve and associated parts of the clutch actuating mechanism.

The gear casing, which is of the conventional or any suitable construction, is indicated as an entirety by the numeral 1.

The numeral 2 indicates one of the disk-like cranks, and the numeral 3 the wrist pin of the engine crank shaft, the body of which is not shown, but may be of the usual or any suitable construction. This crank disk 2 is rigidly secured to a journal 4, which, in accordance with my invention, is made in the form of a tube or sleeve, and by a suitable ball bearing device 5, is journaled in the partition wall of the casing 1. A clutch hub 6, surrounds the outwardly projecting end of the crank shaft journal 4 and is caused to rotate therewith, by a key 7, or other suitable means. A flanged bushing 8 is screwed into the outer end of the journal 4, and its flange holds the hub 6 against outward movement, while its tubular end affords a base of re-action for a clutch actuating spring 9 that is placed within the tubular journal 4. A spring adjusting plunger 10 is extended through the coiled spring 9 and is provided at its inner end with a head, against which the said spring re-acts. The outwardly projecting end of the plunger 10 is threaded at 10$^a$, and applied thereon, are inner and outer nuts, or threaded collars 11 and 12. These nuts 11 and 12 are preferably formed with notched outer faces so that they may be locked in different adjustments by means of pins 13 passed through the threaded end 10$^a$ of the plunger 10, and set in certain of the notches of the said nuts. This plunger, as clearly shown in the drawings, extends through the flanged bushing 8.

The clutch hub 6 has an outwardly projecting cylindrical flange 14 provided with circumferentially spaced notches 15. Loosely journaled on the clutch hub 6 is a spur gear 16 that is integrally formed, or otherwise, secured for rotation with a clutch plate 17 which, as shown, has diametrically opposite laterally projecting driving lugs 18. As shown, the so-called clutch plates 17 are polygonal in outline, but this feature is immaterial. The friction disks 19 and 20 are alternated, and the disks 19 are provided with notches in which the driving lugs 18 of the clutch plate 17 engage to cause them to rotate with the said clutch plate. The disks 20 at their inner edges, project into the notches 15 of the hub 6, so that they are caused to rotate with the said hub.

A presser head 21 is seated for lateral movements on the plunger 10 and is provided with radially projecting arms that fit in the notches 15 of the hub 6, so that the said presser head and hub and the disks 20 are caused to partake of a common rotation. The projecting arms of the presser head 21 overlap and engage the outermost disk 20. The inner thrust nut 11 engages the presser head 20, so that normally, the spring 9 exerts a force tending to hold the disks 19 and 20 in tight frictional engagement; and when the disks are thus set or held, the gear 16 will be caused to rotate with the crank shaft and its journal 4. Obviously, when the spring 9 is compressed, so as to relieve the disks 19 and 20 of pressure, the gear 16 will not be rotated with the crank shaft, when there is a resisting force, such as required to drive the wheels of a motor-cycle.

Here it may be stated that instead of the gear 16, which, from a broad point of view is a driving wheel, might be a sprocket wheel, grooved pulley or frictional driving wheel. However, as shown, it meshes with a gear 22 that constitutes part of the transmission mechanism not necessary for the purpose of this case to further trace. It may, however, be noted that, as shown, the gear 22 is journaled, by ball bearings 23, on a stud 24 secured to the central partition of the gear case 1.

Means has now been described, whereby the multiple-disk clutch will be normally set, and this means includes the novel arrangement of the spring within the tubular or hollow journal of the crank shaft, and the coöperative arrangement of the spring-compressing plunger.

The novel means for moving the plunger 10 is a direction to compress the spring 9 to thus release the clutch disks from pressure will now be described.

Surrounding the threaded outer end 10ª of the plunger 10 is a clutch actuating sleeve 25 provided with external threads 26 that work in the adjacent wall of the gear casing 1, being, as shown, directly engaged with the internal threads of a bushing 27 that is screwed into the said gear casing. This sleeve 25 is provided at its inner end with an inwardly projecting flange, against which is seated the inner ring 28 of a thrust resisting ball bearing device made up of two of such rings and interposed bearing balls 29. The outer thrust nut 12 acts against the outer bearing ring 28, either directly or indirectly, but, as shown, through an interposed washer 30. Rigidly but adjustably clamped on the outer end of the sleeve 25 is an arm 31 which is connected through a suitable rod 32 to a lever, not shown, or to some other suitable primary operating device. The hub of the arm 31, as shown, is in the form of a split collar, the ends of which are clamped together by a bolt 33, so that the said arm may be secured on the said sleeve 25 in different adjustments. Preferably, the outer end of the sleeve 25 is closed by a cap 34, shown as screwed into the same.

As is evident, an oscillatory movement of the arm 31 and clutch actuating sleeve 25 in one direction, will cause the said sleeve to move inward while an oscillatory movement in the opposite direction will cause the same to move outward. When the sleeve 25 is moved inward, the spring 9 will be rendered operative through the plunger 10, thrust nut 11 and clamping head 21, to set the clutch in a manner already noted. When, however, the sleeve 25 is moved outward, it will move the plunger 10 outward with it and compress the spring 9, to thereby relieve the disks 19 and 20 from pressure, and thus open the clutch. In practice, I have found about one-eighth rotation of the sleeve 25 is sufficient to set and release the clutch.

The tension under which the spring 9 will act to set the clutch, may be varied by adjustments of the inner thrust nut 11; and when the nut 11 is adjusted, if the same relation of parts is to be maintained, the outer thrust nut 12 should be correspondingly adjusted.

What I claim is:

1. The combination with driving and driven members, one of which is tubular, of a wheel journaled around said tubular member and provided with a clutch plate, a spring seated in said tubular member, a plunger connected to said spring and extending therefrom out of said tubular member, a clamping head connected to said plunger, coöperating clutch disks interposed between said clutch plate and clamping head with alternate members arranged to move with said clutch plate and tubular member, and a spirally movable clutch actuated collar surrounding the outer end of said plunger and having a swivel connection therewith arranged to positively move said plunger against the tension of said spring to release the clutch.

2. The combination with driving and driven members, one of which is tubular, of a wheel journaled around said tubular member and provided with a clutch plate, a spring seated in said tubular member, a plunger connected to said spring and extending therefrom out of said tubular member, a clamping head connected to said plunger, coöperating clutch disks interposed between said clutch plate and clamping head with alternate members arranged to move with said clutch plate and tubular member, a spirally movable clutch actuating collar surrounding the outer end of said plunger and having a swivel connection therewith arranged to positively move said plunger against the tension of said spring to release the clutch, and an arm adjustably connected to said collar for oscillating the same.

3. The combination with driving and driven members, one of which is tubular, a friction clutch for connecting the said members, and clutch actuating mechanism including a spring located in said tubular member, a plunger subject to said spring and extended therefrom out of the said tubular member, a clutch actuating member connected to said plunger and subject to said spring, an adjusting clutch actuating collar surrounding the outer end of said plunger, and an anti-friction thrust bearing affording a swivel connection between said plunger and collar.

4. The combination with driving and driven members, one of which is tubular, a friction clutch for connecting the said members, and clutch actuating mechanism including a spring located in said tubular member, a plunger subject to said spring and extended therefrom out of the said tubular member, a clutch actuating member connected to said plunger and subject to said spring, an adjusting clutch actuating collar surrounding the outer end of said plunger, and an anti-friction thrust bearing affording a swivel connection between said plunger and collar, the connections between said plunger and thrust bearing and between said plunger and clutch actuating member being adjustable longitudinally of said plunger.

5. The combination with driving and driven members, one of which is tubular, a friction clutch for connecting the said members, and clutch actuating mechanism including a spring located in said tubular member, a plunger subject to said spring and extended therefrom out of the said tubular member, a clutch actuating member connected to said plunger and subject to said spring, an adjusting clutch actuating collar surrounding the outer end of said plunger, an anti-friction thrust bearing affording a swivel connection between said plunger and collar, the connections between said plunger and thrust bearing and between said plunger and clutch actuating member being adjustable longitudinally of said plunger, and an operating arm adjustably connected to said collar.

In testimony whereof I affix my signature in presence of two witnesses.

JOSEPH M. MICHAELSON.

Witnesses:
F. D. MERCHANT,
HARRY D. KILGORE.